L. J. MILLER.
Nut-Locks.

No. 138,268.  Patented April 29, 1873.

James F. Tweedy.
Jennie M. Grant.

Levi J. Miller,
by Job Abbott
Attorney.

UNITED STATES PATENT OFFICE

LEVI J. MILLER, OF ORRVILLE, OHIO.

IMPROVEMENT IN NUT-LOCKS.

Specification forming part of Letters Patent No. 138,268, dated April 29, 1873; application filed March 11, 1873.

*To all whom it may concern:*

Be it known that I, LEVI J. MILLER, of Orrville, in the county of Wayne and State of Ohio, have invented certain new and useful Improvements in Nut-Locks; and that the following is a full, clear, and exact specification thereof, which will enable others skilled in the art to make and use the said invention.

My invention relates to an improved device for preventing nuts from working loose on their nuts, and is particularly applicable to railroads. Said invention consists in the combination of a rail-bolt constructed with a right and a left handed thread and a lock-washer seat with a sliding lock-washer held from turning by its bearing on the seat on the rail-bolt, and having rear flanges which embrace the main or bolt nut, and a front projection which fits over the front or left-handed lock-nut when the washer is slid back, the several parts acting in combination to hold the main nut from working loose, as is hereinafter more fully described.

Figure 1:
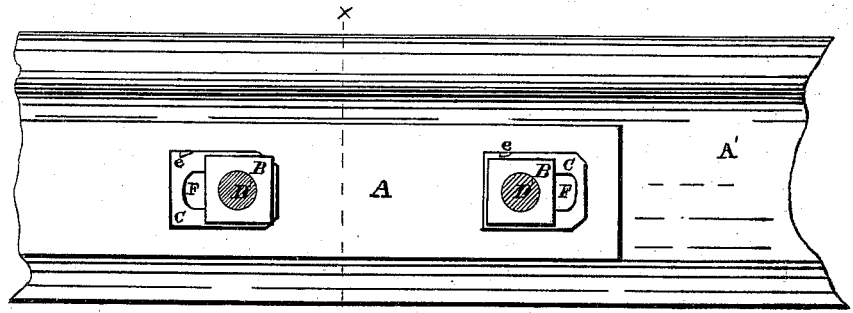
Figure 2:
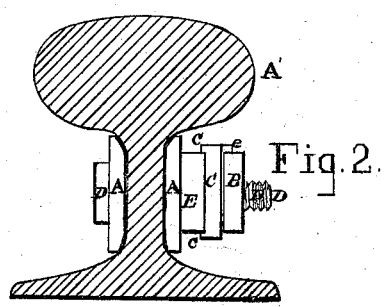
Figure 4:
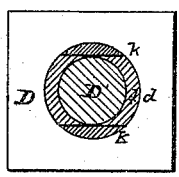
Figure 3:
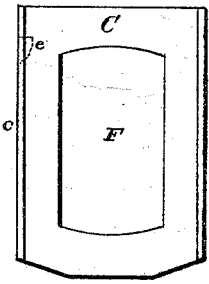

In the accompanying drawing, Figure 1 is a side elevation of a rail-joint embodying my invention. Fig. 2 is a cross-section of the same through the line $x\ x$ in Fig. 1. Figs. 3 are enlarged detail views, showing plans and elevations of the washer and left-handed nut. Fig. 4 is an end view of the rail-bolt, and Fig. 5 a plan of the same.

Figure 5:
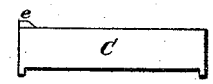
Figure 5:
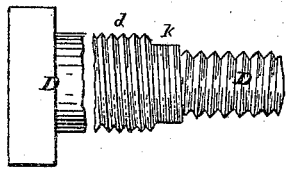

A A are the fish-bars, and A' the rail; D, a rail-bolt having a right-handed thread, $d$, (of which a portion, $k$, is removed from two sides to form flat seats,) as shown in Fig. 5, and a left-handed thread, D'. The end of the bolt D on which the left-handed thread D' is cut is of less diameter than the remainder of the bolt. E is a nut of ordinary construction, which screws onto the portion $d$ of the rail-bolt D. B, Figs. 3, is a nut having a left-handed thread, which screws onto the lower part D' of the bolt D, said nut B having notches $s$ on each edge of its inner face. C, Figs. 3, is a washer, which is placed between the two nuts on the part $k$ of the bolt D, said washer C being of rectangular shape, and having a central slot, F, of the same width as the flattened part $k$ of the bolt D. Said washer also has flanges $c$ on the edges of its inner sides, and a projection, $e$, near the upper left-hand corner of its outer edge.

In applying my invention for any desired purpose—for instance, to the bolts of a rail-road-joint—the bolt D is first passed through the fish-bars A A and the web of the rail A'. The main or bolt nut E is then screwed onto the bolt D just past the place where the parts $k$ have been removed. Next, the washer C is slipped onto the part $k$ of the bolt D, the flanges $c$ embracing the sides of the main nut $e$, so that the nut E and washer C, when forced together, are prevented from turning either way by the bearing of the sides of the slot F against the flat faces of the part $k$. The main nut E and washer C are held together by means of the outside left-handed nut B. Said nut B is screwed onto the part D' of the bolt D, while the washer C is slid back so that the projection $e$ on its outer face shall not come in contact with the nut B, as shown on the left-hand nut in Fig. 1, until the two nuts and the washer are pressed firmly together. The washer C is then slid back to the position shown on right-hand nut in Fig. 1. After the washer C is thus slid back into the position shown in Fig. 2, and on right-hand nut in Fig. 1, the nut B has but a slight motion either way; being held from turning off by the flange $e$, the main nut E is securely locked on the bolt D, and the different parts of the device are held in the position shown in Fig. 2, and on right-hand nut in Fig. 1. If it is desired to remove the bolt it is only necessary to slide the washer C back to the position shown on left-hand nut in Fig. 1, when the parts can easily be taken off. The washer C can be readily secured from accidentally working over from the position shown on right-hand nut in Fig. 1, where it serves to hold the nut B from turning off, to the position shown on left-hand nut in Fig. 1, where it allows said nut B to be turned off, by giving the nut B a slight backward turn when the washer is in the position shown on right-hand nut in Fig. 1, by which means the projection $e$ is made to enter one of the notches $s$ in the nut B, which holds the washer C from sliding.

What I claim as my invention, and desire to secure by Letters Patent, is—

1. The lock-washer C with the oblong slot F, rear flanges $c\,c$, and front corner projection $e$, the several parts being arranged substantially as and for the purpose specified.

2. The combination of the bolt D with right and left handed threads $d$ D′ and flattened seat $k$, washer C with slot F, rear flanges $c\,c$, and corner projection $e$, main nut E, and lock-nut B, the several parts being arranged and operating substantially as and for the purpose specified.

3. The lock-nut B with rear notches $s$, in combination with the sliding washer C with projection $e$, substantially as and for the purpose specified.

As evidence of the foregoing witness my hand this 28th day of February, A. D. 1873.

LEVI J. MILLER.

Witnesses:
  JAMES EVANS,
  WM. M. GAILEY.